United States Patent
Rana et al.

(10) Patent No.: US 8,060,100 B1
(45) Date of Patent: Nov. 15, 2011

(54) NEIGHBOR LIST CONTROL FOR A WIRELESS COMMUNICATION SYSTEM

(75) Inventors: Abdul Quddus Rana, Overland Park, KS (US); Syed Hassan Raza, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 463 days.

(21) Appl. No.: 12/419,643

(22) Filed: Apr. 7, 2009

(51) Int. Cl.
  *H04W 36/00* (2009.01)
(52) U.S. Cl. ........ 455/443; 455/439; 455/442; 455/440; 455/524; 370/328; 370/329; 370/335; 370/208; 370/209
(58) Field of Classification Search .............. 455/62, 455/443, 452, 453, 525, 436, 439, 440, 450, 455/456, 517, 524, 560; 370/328, 329, 331, 370/335, 342, 208, 209
See application file for complete search history.

(56) References Cited

U.S. PATENT DOCUMENTS

| | | | | |
|---|---|---|---|---|
| 5,911,120 A * | 6/1999 | Jarett et al. | ..... | 455/417 |
| 6,069,871 A | 5/2000 | Sharma et al. | | |
| 6,178,327 B1 * | 1/2001 | Gomez | ..... | 455/445 |
| 6,195,342 B1 * | 2/2001 | Rohani | ..... | 370/331 |
| 6,456,606 B1 * | 9/2002 | Terasawa | ..... | 370/331 |
| 6,567,666 B2 * | 5/2003 | Czaja et al. | ..... | 455/442 |
| 6,980,810 B1 * | 12/2005 | Gerakoulis et al. | ..... | 455/450 |
| 7,076,274 B2 * | 7/2006 | Jollota et al. | ..... | 455/561 |
| 7,299,051 B2 * | 11/2007 | Hornsey | ..... | 455/447 |
| 7,409,215 B2 * | 8/2008 | Kurose et al. | ..... | 455/436 |
| 7,639,661 B2 * | 12/2009 | Iwami et al. | ..... | 370/345 |
| 2007/0225029 A1 | 9/2007 | Abusch-Magder | | |

* cited by examiner

*Primary Examiner* — Linh Nguyen

(57) ABSTRACT

A control system processes a first neighbor list for a first base station to identify a second base station and a third base station. The control system processes a second neighbor list for the second base station and a third neighbor list for the third base station to determine if the second base station is on the third neighbor list and if the third base station is on the second neighbor list. The control system processes wireless coverage data for the second base station and the third base station to determine if a wireless coverage overlap exists between the second base station and the third base station. If the overlap exists and if one of the base stations is not on the other base station's neighbor list, then the control system indicates that the missing base station should be added to the other base station's neighbor list.

20 Claims, 6 Drawing Sheets

NEIGHBOR LIST CONTROL FOR A WIRELESS COMMUNICATION SYSTEM

TECHNICAL BACKGROUND

Wireless base stations transmit neighbor lists to wireless communication devices. The neighbor lists identify alternative base stations that the wireless communication devices may use if their current base station has a weak wireless signal. Thus, a wireless communication device monitors the signal strength of the base stations on the neighbor list to determine if they should be handed-off from their current base station to one of these alternative base stations. The neighbor lists may be manually configured by network engineers based on signal strength scans, business relationships, or network designs.

OVERVIEW

A neighbor list control system for a wireless communication system processes a first neighbor list for a first base station to identify a second base station and a third base station. The control system processes a second neighbor list for the second base station and a third neighbor list for the third base station to determine if the second base station is on the third neighbor list and if the third base station is on the second neighbor list. The control system processes wireless coverage data for the second base station and the third base station to determine if a wireless coverage overlap exists between the second base station and the third base station. If the overlap exists and if one of the base stations is not on the other base station's neighbor list, then the control system indicates that the missing base station should be added to the other base station's neighbor list.

DETAILED DESCRIPTION

Figure 1:
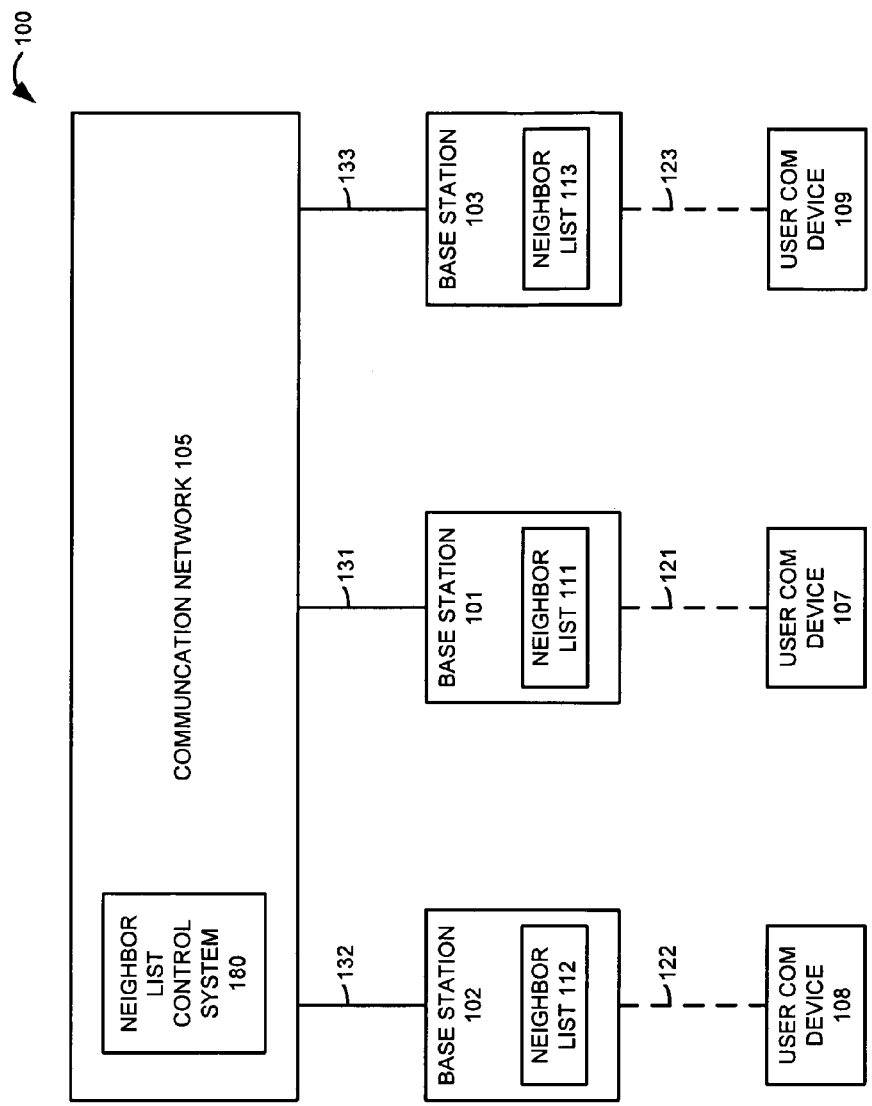
FIG. 1 illustrates a wireless communication system.

FIG. 1 illustrates wireless communication system 100. Wireless communication system 100 includes base stations 101-103, communication network 105, and user communication devices 107-109. Base stations 101-103 and user communication devices 107-109 communicate over respective wireless links 121-123. Base stations 101-103 and communication network 105 communicate over respective communication links 131-133.

Base stations 101-103 have respective neighbor lists 111-113. A neighbor list identifies other base stations that are suitable for user device hand-offs, but the neighbor list may not include every base station that could participate in a hand-off. For example, neighbor list 111 includes base stations 102-103 because base stations 102-103 are suitable for user device hand-offs with base station 101. However, neighbor list 112 does not include base station 103 even though a hand-off between base stations 102-103 is possible.

Base stations 101-103 wirelessly transfer their neighbor lists to the user communication devices they serve, so these user devices can monitor hand-off parameters of the base stations on the neighbor list. For example, base station 102 transfers neighbor list 112 to user communication device 108, and in response, user communication device 108 may monitor the wireless signal strength of the base stations on the neighbor list. If the wireless signal strength of one of these base stations exceeds that of base station 102, then base station 102 would typically hand-off user communication device 108 to the base station having the stronger wireless signal.

Communication network 105 includes neighbor list control system 180. Neighbor list control system 180 modifies neighbor lists to off-load overloaded base stations, although control system 180 may modify the neighbor lists for a different purpose. Neighbor list control system 180 processes network performance data, neighbor lists, and wireless coverage data to indicate additional base stations that could be added to the neighbor lists. For example, neighbor list control system 180 could indicate that base station 103 should be added to neighbor list 112. Although neighbor list control system 180 is shown within communication network 105, control system 180 could be located externally to and operate independently of communication network 105.

Figure 2:
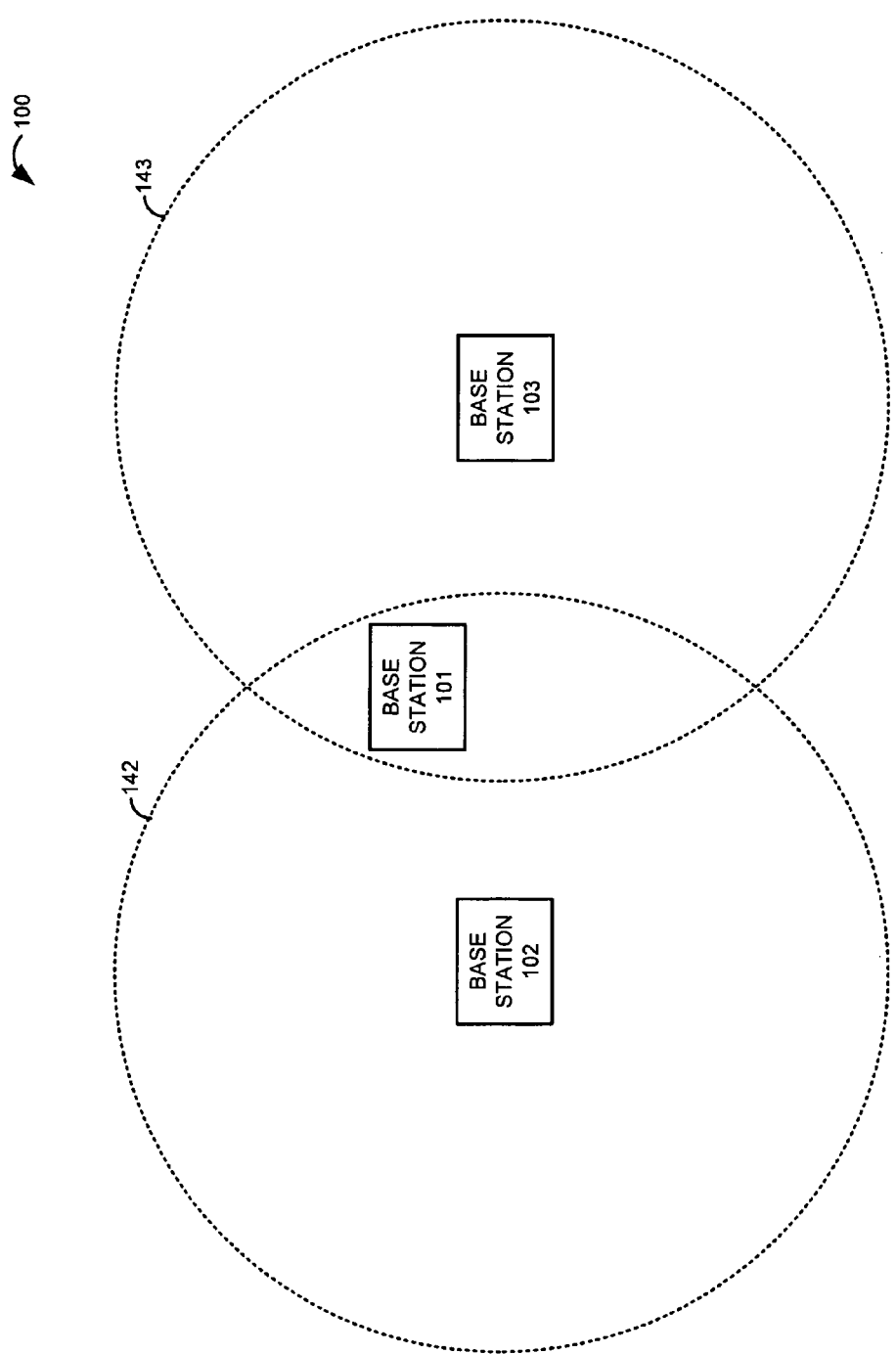
FIG. 2 illustrates the wireless communication system.

FIG. 2 illustrates another view of wireless communication system 100. Base station 102 is shown with its wireless coverage area 142, and base station 103 is shown with its wireless coverage area 143. Base station 101 also has a wireless coverage area that is omitted for clarity. A wireless coverage area indicates the likely geographic extent of wireless communications with a base station. Although shown as a circle, these wireless coverage areas may take various shapes and may vary over time. Note the wireless coverage overlap that exists between wireless coverage areas 142-143 proximate to base station 101.

Figure 3:
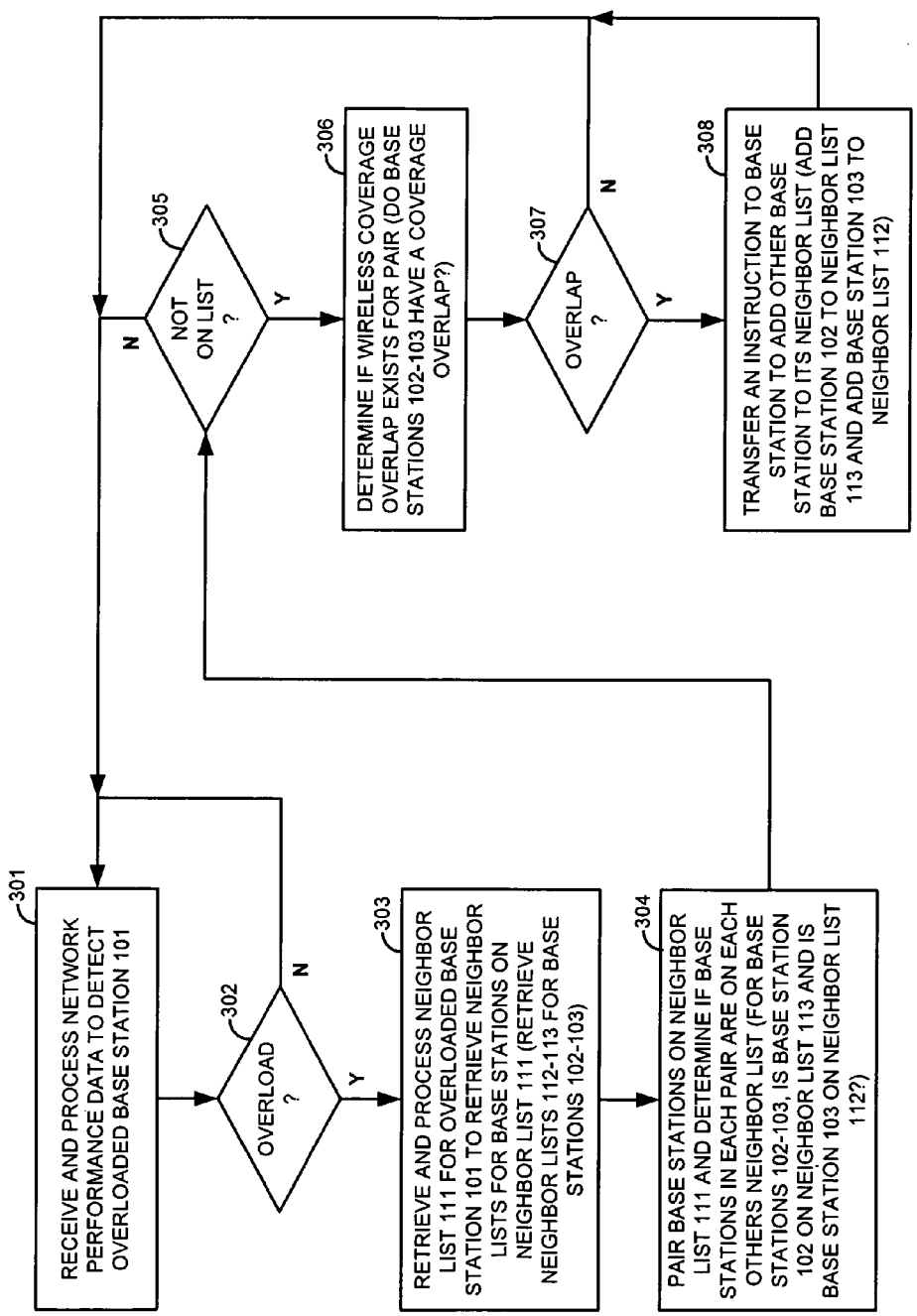
FIG. 3 illustrates the operation of a neighbor list control system for the wireless communication system.

FIG. 3 illustrates the operation of neighbor list control system 180. Neighbor list control system 180 receives and processes network performance data to detect if base station 101 is overloaded (301). The network performance data could be a number of dropped communication sessions, and base station overload could be determined if the number of dropped communication sessions for base station 101 exceeds a threshold.

If base station 101 is overloaded (302), then control system 180 retrieves and processes neighbor list 111 to retrieve the neighbor lists for the base stations on neighbor list 111 (303). Since base stations 102-103 are on neighbor list 111, control system 180 retrieves neighbor lists 112-113. Control system 180 pairs the base stations on neighbor list 111 and determines if the base stations in each pair are on each others neighbor lists (304). For example, control system 180 determines if base station 102 is on neighbor list 113 for base station 103, and determines if base station 103 is on neighbor list 112 for base station 102. For the pairings, each base station is paired with all other base stations on the list, so each possible base station pairing is analyzed.

If one of the paired base stations is not on the other base station's neighbor list (305), then control system 180 determines if a wireless coverage overlap exists for the base station pair (306). Since base stations 102-103 are not on each others neighbor lists, control system 180 determines if a wireless coverage overlap exists for base stations 102-103. If a wireless coverage overlap exists for the base station pair (307), then control system 180 transfers an instruction to add the missing base stations to the neighbor lists (308). In this example, control system 180 transfers an instruction to add base station 102 to neighbor list 113 and an instruction to add base station 103 to neighbor list 112.

Figure 4:
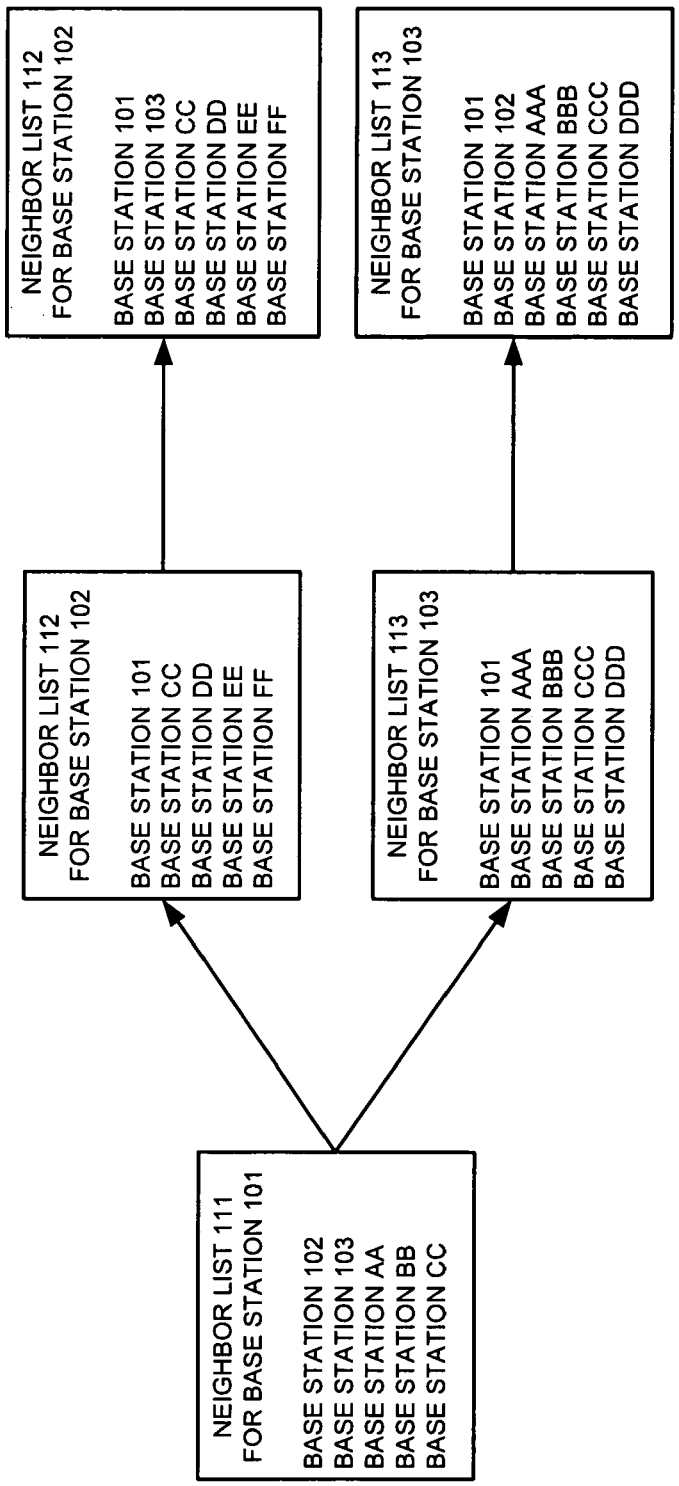
FIG. 4 illustrates neighbor list processing for the wireless communication system.

FIG. 4 illustrates the above-described neighbor list processing for wireless communication system 100. Neighbor list 111 for overloaded base station 101 includes base stations 102-103. Neighbor list 112 for base station 102 does not include base station 103. Neighbor list 113 for base station 103 does not include base station 102. Since a wireless coverage overlap exists between base stations 102-103, base station 102 is added to neighbor list 113 for base station 103, and base station 103 is added to neighbor list 112 for base station 102. Note that a similar process would be performed for the other base stations on neighbor list 111.

Referring back to FIG. 2, the determination of wireless coverage overlap between base stations 102-103 is discussed. The wireless coverage overlap for base stations 102-103 is indicated by the overlap between wireless coverage areas 142-143. One factor that can be used to detect this wireless coverage overlap is antenna direction. If an antenna for base station 102 transmits and receives wireless signals in the direction of base station 103, and if an antenna for base station 103 transmits and receives wireless signals in the direction of base station 102, then a coverage overlap may exist. If the antennas for base stations 102-103 are not directed at each other, then a coverage overlap does not exist.

Another factor that can be used to detect the wireless coverage overlap is transmit power. If base stations 102-103 transmit at adequate power relative to their distance apart, so that wireless communications are effective for more than half of that distance, then a coverage overlap may exist. If base stations 102-103 do not transmit at adequate power relative to their distance apart, then a coverage overlap does not exist. Thus, control system 180 may process antenna direction and transmit power to determine if a wireless coverage overlap exists for base stations 102-103.

Another factor that can be used to detect a wireless coverage overlap between base stations 102-103 is the geographic locations of the users of base stations 102-103. The locations could be used to map the extent of wireless coverage areas 142-143 and geographically detect the coverage overlap. The locations could be processed for proximity to one another to determine how close the users of base station 102 are to the users of base station 103.

Another factor that can be used to detect a wireless coverage overlap between base stations 102-103 is the data from a wireless network coverage model. Many wireless communication systems run mathematical models to project likely wireless coverage areas on a map. This model data could be processed to detect a wireless coverage overlap between base stations 102-103.

The detection of the wireless coverage overlap may also include an assessment of the size of the overlap. If the wireless coverage overlap for base stations 102-103 is tiny, then hand-offs between base stations 102-103 would be fairly small in number and ineffective. If the wireless coverage overlap for base stations 102-103 is large or lengthy, then the hand-offs between base stations 102-103 would be larger in number and quite effective. Thus, control system 180 may determine if the geographic area of the wireless coverage overlap exceeds a size threshold.

Referring back to FIG. 1, base stations 101-103 each comprise RF communication circuitry and an antenna. The RF communication circuitry typically includes an amplifier, filter, RF modulator, and signal processing circuitry. Base stations 101-103 may also comprise a router, server, memory device, software, processing circuitry, cabling, power supply, network communication interface, structural support, or some other communication apparatus. Base stations 101-103 could be Internet access nodes, telephony service nodes, wireless data access points, or some other wireless communication systems—including combinations thereof.

User communication devices 108-109 each comprise Radio Frequency (RF) communication circuitry and an antenna. The RF communication circuitry typically includes an amplifier, filter, modulator, and signal processing circuitry. User communication devices 108-109 may also include a user interface, memory device, software, processing circuitry, or some other communication components. User communication devices 108-109 may be telephones, computers, e-books, mobile Internet appliances, wireless network interface cards, media players, game consoles, or some other wireless communication apparatus—including combinations thereof.

Communication network 105 comprises communication equipment. The communication equipment might include base station controllers, network gateways, mobile switching centers, routers, switches, servers, computers, communication links, or some other communication devices—including combinations thereof. Wireless links 121-123 use the air or space as the transport media. Wireless links 121-123 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 131-133 use metal, glass, air, space, or some other material as the transport media. Communication links 131-133 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 131-133 could be direct links or may include intermediate networks, systems, or devices.

Neighbor list control system 180 comprises a computer system and communication interface. Neighbor list control system 180 may also include other components such a router, server, data storage system, and power supply. Neighbor list control system 180 may reside in a single device or may be distributed across multiple devices. Neighbor list control system 180 could be integrated within the components of communication network 105.

Figure 5:
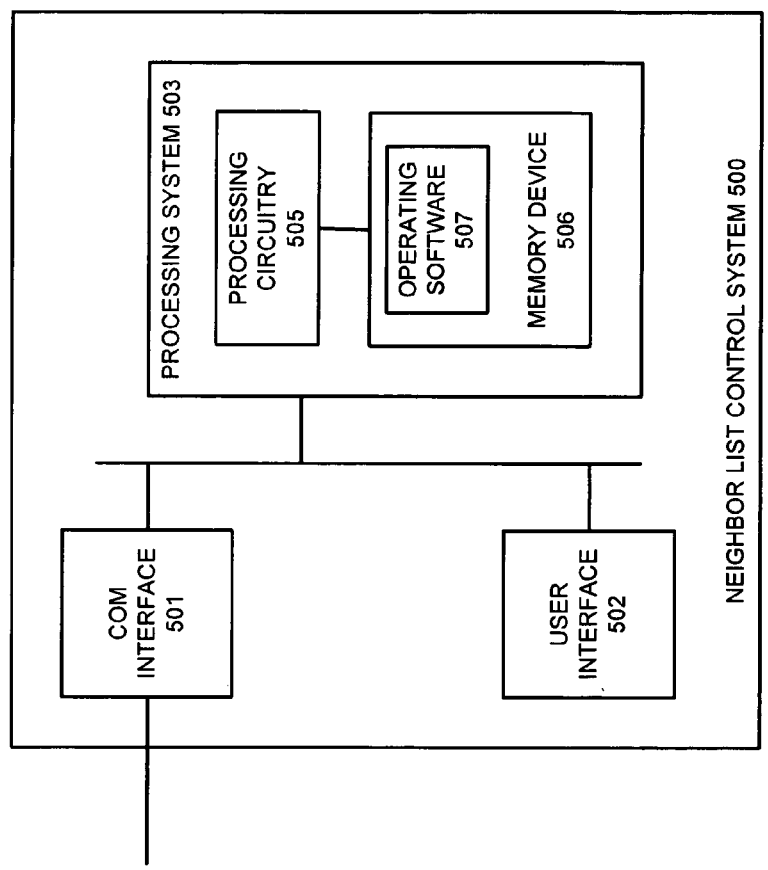
FIG. 5 illustrates a neighbor list control system.

FIG. 5 illustrates neighbor list control system 500. Neighbor list control system 500 is an example of neighbor list control system 180, although control system 180 may use alternative configurations. Neighbor list control system 500 comprises communication interface 501, user interface 502, and processing system 503. Processing system 503 is linked to communication interface 501 and user interface 502. Processing system 503 includes processing circuitry 505 and memory device 506 that stores operating software 507.

Communication interface 501 comprises components that communicate over communication links, such as network cards, ports, RF transceivers, processing circuitry and software, or some other communication devices. Communication interface 501 may be configured to communicate over metallic, wireless, or optical links. Communication interface 501 may be configured to use TDM, IP, Ethernet, optical networking, wireless protocols, communication signaling, or some other communication format—including combinations thereof. Communication interface 501 receives network performance data, neighbor lists, and wireless coverage data. Communication interface 501 transfers instructions to add base stations to neighbor lists.

User interface 502 comprises components that interact with a user. User interface 502 may include a keyboard, display screen, mouse, touch pad, or some other user input/output apparatus. User interface 502 may be omitted in some examples.

Processing circuitry 505 comprises microprocessor and other circuitry that retrieves and executes operating software 507 from memory device 506. Memory device 506 comprises a disk drive, flash drive, data storage circuitry, or some other memory apparatus. Operating software 507 comprises computer programs, firmware, or some other form of machine-readable processing instructions. Operating software 507 may include an operating system, utilities, drivers, network interfaces, applications, or some other type of software. When executed by circuitry 505, operating software 507 directs processing system 503 to operate control system 500 as described herein. In particular, operating software 507 directs processing system 503 to process network performance data, neighbor lists, and wireless coverage data to indicate base stations to add to neighbor lists as described herein.

Figure 6:
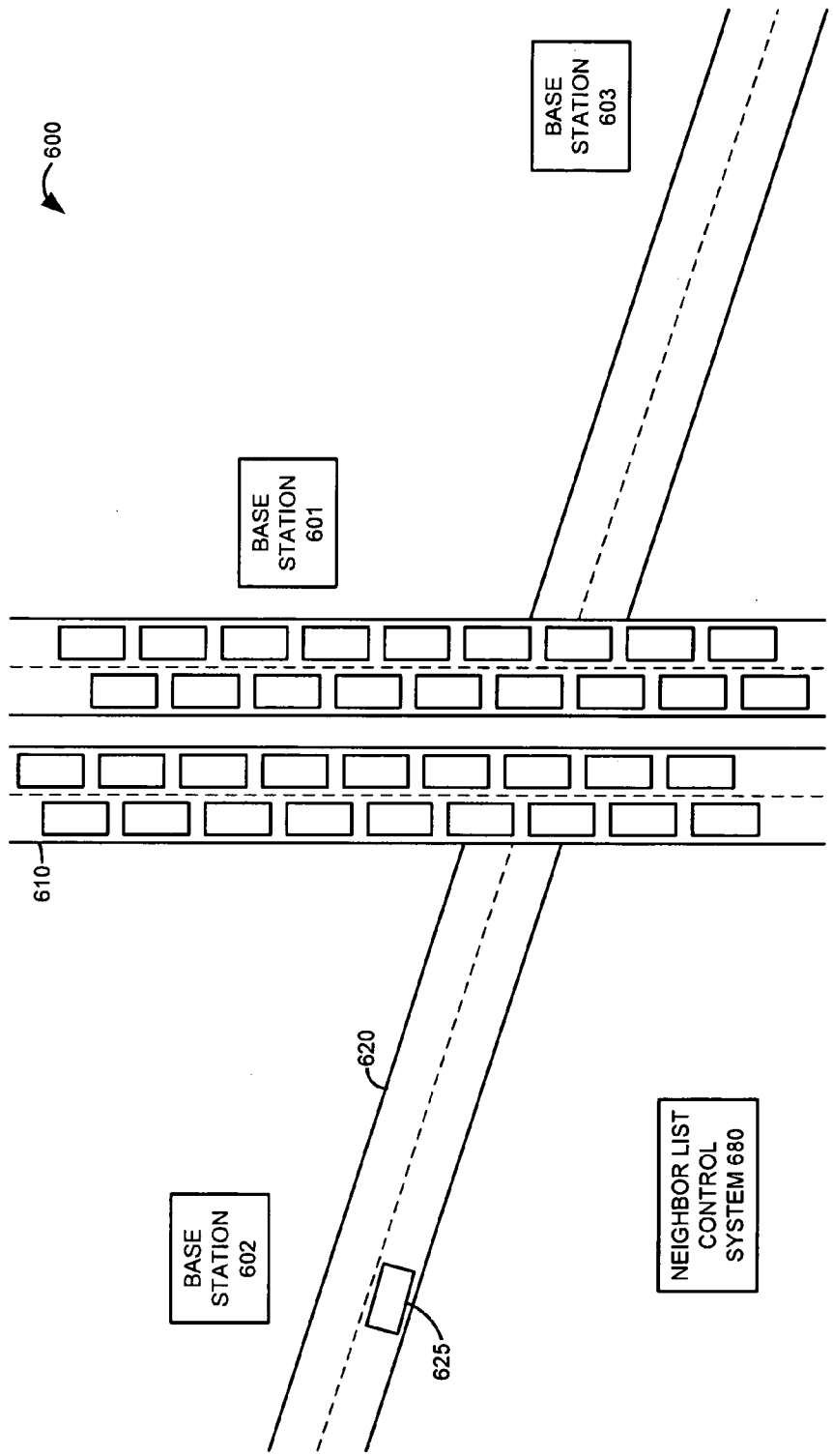
FIG. 6 illustrates a wireless communication system.

FIG. 6 illustrates an operating environment for wireless communication system 600. Wireless communication system 600 is an example of wireless communication system 100, although system 100 may operate in different environments. Wireless communication system 600 includes base stations 601-603 and neighbor list control system 680. For clarity, the user devices, communication links, and other network systems are not shown on FIG. 6.

Base station 601 is near highway 610 which is crowded with cars that carry wireless communication users. Thus, base station 601 is overloaded. Base station 602 is near road 620 on one side of highway 610, and base station 603 is near road 620 on the other side of highway 610. Car 625 having a wireless communication user is traveling on road 620 from base station 602 to base station 603.

Base stations 602-603 are not on each other's neighbor lists, but they do have a wireless coverage overlap on road 620. Base stations 602-603 are both on the neighbor list of base station 601. In the current scenario, base station 602 would hand-off the wireless user in car 625 to base station 601, and base station 601 would hand-off the wireless user in car 625 to base station 603. Since base station 601 is overloaded, the hand-off from base station 602 to base station 601 may fail. A direct hand-off from base station 602 to base station 603 would not occur because base station 603 is not on the neighbor list for base station 602.

In response to the overload of base station 601, a neighbor list control system 680 processes the neighbor list for base station 601 to identify base stations 602-603. Control system 680 processes the neighbor list for base station 602 to determine that base station 603 is not on its neighbor list. Control system 680 processes wireless coverage data to detect the coverage overlap between base stations 602-603. In response, control system 680 instructs base station 602 to add base station 603 to its neighbor list. In this new scenario, base station 602 can hand-off the wireless user in car 625 directly to base station 603 without using overloaded base station 601. This relieves overloaded base station 601 and provides better wireless communication service to the wireless user in car 625.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A neighbor list control system for wireless communication system comprising:
   a communication interface configured to receive a first neighbor list for a first base station, a second neighbor list for a second base station, a third neighbor list for a third base station, and wireless coverage data for the second base station and the third base station;
   a processing system configured to process the first neighbor list to identify a second base station and a third base station on the first neighbor list, process the second neighbor list and the third neighbor list to determine if the second base station is on the third neighbor list and if the third base station is on the second neighbor list, process the wireless coverage data to determine if a wireless coverage overlap exists between the second base station and the third base station; and
   if a wireless coverage overlap exists between the second base station and the third base station and if the second base station is not on the third neighbor list, then the processing system is configured to indicate that the second base station should be added to the third neighbor list, and if the wireless coverage overlap exists between the second base station and the third base station and if the third base station is not on the second neighbor list, then the processing system is configured to indicate that the third base station should be added to the second neighbor list.

2. The neighbor list control system of claim 1 wherein:
   the communication interface is configured to receive network performance data; and
   the processing system is configured to process the network performance data to determine that the first base station is overloaded, and to process the first neighbor list to identify the second base station and the third base station in response to determining that the first base station is overloaded.

3. The neighbor list control system of claim 2 wherein the processing system is configured to process the network performance data to determine that a number of dropped communication sessions for the first base station exceeds a threshold to determine that the first base station is overloaded.

4. The neighbor list control system of claim 1 wherein the processing system is configured to process antenna direction data for the second base station and the third base station to determine if the wireless coverage overlap exists.

5. The neighbor list control system of claim 1 wherein the processing system is configured to process transmit power data for the second base station and the third base station to determine if the wireless coverage overlap exists.

6. The neighbor list control system of claim 1 wherein the processing system is configured to process location data for users of the second base station and the third base station to determine if the wireless coverage overlap exists.

7. The neighbor list control system of claim 1 wherein the wireless coverage data is generated by a wireless network coverage model.

8. The neighbor list control system of claim 1 wherein the processing system is configured to determine that a geographic area of the wireless coverage overlap exceeds a threshold.

9. The neighbor list control system of claim 1 wherein the processing system is configured to process the wireless coverage data to determine if the wireless coverage overlap exists in response to determining that the second base station is not on the third neighbor list.

10. The neighbor list control system of claim 1 wherein the processing system is configured to generate an instruction to add the second base station to the third neighbor list and the communication interface is configured to transfer the instruction for delivery to the third base station.

11. A method of operating a neighbor list control system for wireless communication system, the method comprising:
processing a first neighbor list for a first base station to identify a second base station and a third base station on the first neighbor list;
retrieving and processing a second neighbor list for the second base station and a third neighbor list for the third base station to determine if the second base station is on the third neighbor list and if the third base station is on the second neighbor list;
retrieving and processing wireless coverage data for the second base station and the third base station to determine if a wireless coverage overlap exists between the second base station and the third base station;
if a wireless coverage overlap exists between the second base station and the third base station and if the second base station is not on the third neighbor list, then indicating that the second base station should be added to the third neighbor list; and
if the wireless coverage overlap exists between the second base station and the third base station and if the third base station is not on the second neighbor list, then indicating that the third base station should be added to the second neighbor list.

12. The method of claim 11 further comprising receiving and processing network performance data to determine that the first base station is overloaded, and wherein retrieving and processing the first neighbor list to identify the second base station and the third base station comprises retrieving and processing the first neighbor list to identify the second base station and the third base station in response to determining that the first base station is overloaded.

13. The method of claim 12 wherein processing the network performance data to determine that the first base station is overloaded comprises processing the network performance data to determine that a number of dropped communication sessions for the first base station exceeds a threshold.

14. The method of claim 11 wherein retrieving and processing the wireless coverage data to determine if the wireless coverage overlap exists comprises retrieving and processing antenna direction data for the second base station and the third base station.

15. The method of claim 11 wherein retrieving and processing the wireless coverage data to determine if the wireless coverage overlap exists comprises retrieving and processing transmit power data for the second base station and the third base station.

16. The method of claim 11 wherein retrieving and processing the wireless coverage data to determine if the wireless coverage overlap exists comprises retrieving and processing location data for users of the second base station and the third base station.

17. The method of claim 11 wherein retrieving and processing the wireless coverage data to determine if the wireless coverage overlap exists comprises retrieving and processing the wireless coverage data generated by a wireless network coverage model.

18. The method of claim 11 wherein retrieving and processing the wireless coverage data to determine if the wireless coverage overlap exists comprises determining that a geographic area of the wireless coverage overlap exceeds a threshold.

19. The method of claim 1 wherein retrieving and processing the wireless coverage data to determine if the wireless coverage overlap exists comprises retrieving and processing the wireless coverage data to determine if the wireless coverage overlap exists in response to determining that the second base station is not on the third neighbor list.

20. The method of claim 11 wherein indicating that the second base station should be added to the third neighbor list comprises transferring an instruction for delivery to the third base station to add the second base station to the third neighbor list.

* * * * *